United States Patent
Okaji et al.

(10) Patent No.: US 9,739,359 B2
(45) Date of Patent: Aug. 22, 2017

(54) HYDRAULIC POWER TRANSMISSION

(71) Applicant: HONDA MOTOR CO., LTD., Tokyo (JP)

(72) Inventors: Tomoya Okaji, Wako (JP); Fumiya Nishii, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/091,571

(22) Filed: Apr. 6, 2016

(65) Prior Publication Data
US 2016/0341293 A1 Nov. 24, 2016

(30) Foreign Application Priority Data
May 21, 2015 (JP) .................. 2015-103845

(51) Int. Cl.
*F16H 45/02* (2006.01)

(52) U.S. Cl.
CPC ..... *F16H 45/02* (2013.01); *F16H 2045/0205* (2013.01); *F16H 2045/0226* (2013.01); *F16H 2045/0263* (2013.01); *F16H 2045/0278* (2013.01)

(58) Field of Classification Search
CPC .................................... F16F 15/223
See application file for complete search history.

(56) References Cited

U.S. PATENT DOCUMENTS 8,342,306 B2* 1/2013 Werner ............. F16F 15/12353
  192/213.1
8,435,123 B2* 5/2013 Bai ........................ F16D 3/12
  464/68.2

FOREIGN PATENT DOCUMENTS

JP     4987617 B2    2/2009
JP     2011-058557   3/2011

* cited by examiner

*Primary Examiner* — Mark Manley
(74) *Attorney, Agent, or Firm* — Mori & Ward, LLP

(57) ABSTRACT

A hydraulic power transmission includes a pump impeller, a turbine impeller, a cover member, a lock-up clutch, an output member, a plurality of primary springs, a plurality of secondary springs, an intermediate member, a first dynamic vibration absorber, and a second dynamic vibration absorber. The intermediate member holds the output member and connects the primary springs and the secondary springs. The first dynamic vibration absorber is attached to the intermediate member and has a first frequency. The first dynamic vibration absorber includes a first mass body and a first damper member. The second dynamic vibration absorber is attached to the intermediate member and has a second frequency different from the first frequency. The second dynamic vibration absorber includes a second mass body and a second damper member.

20 Claims, 10 Drawing Sheets

HYDRAULIC POWER TRANSMISSION

CROSS-REFERENCE TO RELATED APPLICATIONS

The present application claims priority under 35 U.S.C. §119 to Japanese Patent Application No. 2015-103845, filed May 21, 2015, entitled "Hydraulic Power Transmission." The contents of this application are incorporated herein by reference in their entirety.

BACKGROUND

1. Field

The present invention relates to a hydraulic power transmission.

2. Description of the Related Art

Conventionally, a hydraulic power transmission such as a torque converter has been used as a starting device of a transmission of a vehicle. The torque converter includes a pump impeller, a turbine impeller coupled to the pump impeller via a hydraulic oil circulation circuit, and a cover member connected to the pump impeller to cover an outside surface of the turbine impeller. Many torque converters include a lock-up clutch capable of mechanically coupling the cover member and the turbine impeller to each other in order to enhance efficiency of the torque transmission.

In a torque converter including a lock-up clutch, vibration of a drive system occurs due to rotational fluctuation of the engine as the lock-up clutch is connected. Then, in order to reduce vibration of the drive system, it is common to interpose a damper mechanism such as a coil spring between a pump impeller and a turbine impeller. Further, in recent years, there is provided a torque converter including an auxiliary mass body and a spring, in which a dynamic vibration absorber (or a dynamic damper) configured to absorb or control excessive vibration is disposed to further reduce vibration. For example, Japanese Unexamined Patent Application Publication No. 2011-058557 discloses a torque converter in which a dynamic vibration absorber is directly attached to a turbine impeller. Also, Japanese Patent No. 4987617 discloses a torque converter in which a dynamic vibration absorber is disposed in an intermediate member disposed between a pump impeller and a turbine impeller, in an example illustrated in FIG. 4.

SUMMARY

According to one aspect of the present invention, a hydraulic power transmission includes a pump impeller, a turbine impeller, a cover member, a lock-up clutch, and an output member. The pump impeller is configured to be rotated around a center axis by a drive force from a drive source. The turbine impeller is configured to be rotated around the center axis by flow of a fluid generated by rotation of the pump impeller. The cover member is connected to the pump impeller to cover an outer side of the turbine impeller. The lock-up clutch is capable of mechanically coupling the cover member and the turbine impeller to each other. The output member is configured to be rotated around the center axis integrally with the turbine impeller and coupled to an output shaft. A plurality of primary springs are attached to the lock-up clutch. A plurality of secondary springs are attached to the output member. An intermediate member is disposed between the primary springs and the secondary springs holding the output member and coupled to each other in series. A first dynamic vibration absorber comprising a first mass body and a first damper member and a second dynamic vibration absorber comprising a second mass body and a second damper member are attached to the intermediate member. The first dynamic vibration absorber and the second dynamic vibration absorber have set frequencies different from each other.

According to another aspect of the present invention, a hydraulic power transmission includes a pump impeller, a turbine impeller, a cover member, a lock-up clutch, an output member, a plurality of primary springs, a plurality of secondary springs, an intermediate member, a first dynamic vibration absorber, and a second dynamic vibration absorber. The pump impeller is to be rotated around a center axis by a drive force from a drive source. The turbine impeller is to be rotated around the center axis by fluid flow generated by rotation of the pump impeller. The cover member is connected to the pump impeller to cover the turbine impeller. The lock-up clutch is capable of mechanically coupling the cover member and the turbine impeller. The output member is coupled to an output shaft and to be rotated around the center axis integrally with the turbine impeller. The plurality of primary springs are attached to the lock-up clutch. The plurality of secondary springs are attached to the output member. The intermediate member holds the output member and connects the primary springs and the secondary springs. The first dynamic vibration absorber is attached to the intermediate member and has a first frequency. The first dynamic vibration absorber includes a first mass body and a first damper member. The second dynamic vibration absorber is attached to the intermediate member and has a second frequency different from the first frequency. The second dynamic vibration absorber includes a second mass body and a second damper member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
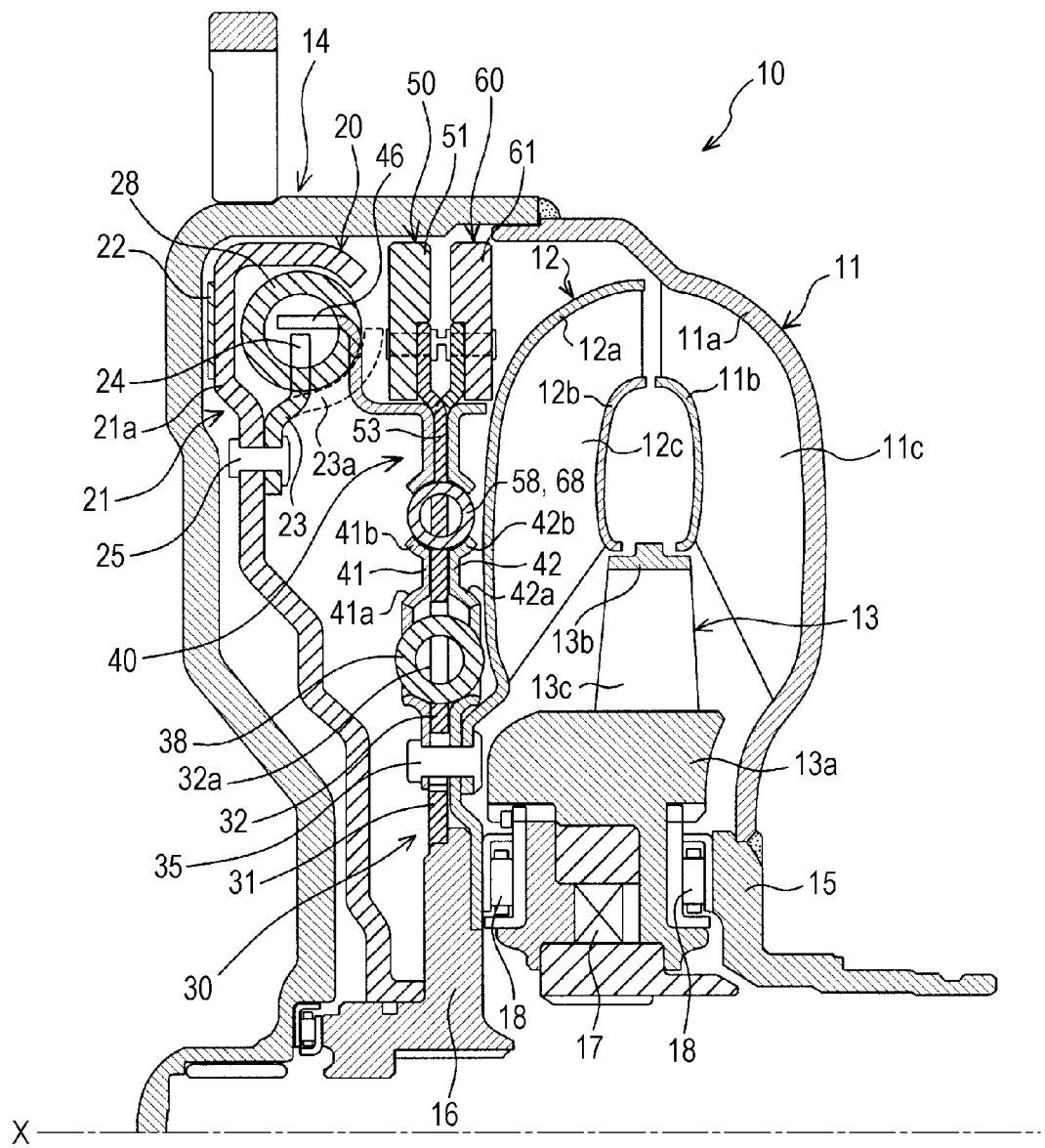
FIG. 1 is an overall schematic diagram of a torque converter according to a first embodiment.

The embodiments will now be described with reference to the accompanying drawings, wherein like reference numerals designate corresponding or identical elements throughout the various drawings.

First Embodiment

Hereinafter, embodiments of the present disclosure are described in detail with reference to the accompanying drawings. First, an overall structure of a torque converter 10 (hydraulic power transmission) according to the present embodiment is described. FIG. 1 is an overall schematic diagram of the torque converter 10 according to the first embodiment. An axial direction of the torque converter 10 is a direction where the center axis X extends and may be simply referred to as an "axial direction". A circumferential direction of the torque converter 10 is a circumferential direction around the center axis X and hereinafter may be simply referred to as a "circumferential direction". A radial direction of the torque converter 10 is a diameter or radial direction passing through the center axis X and hereinafter may be simply referred to as a "radial direction".

(Overall Structure of Torque Converter)

As illustrated in FIG. 1, the torque converter 10 according to the present embodiment includes a pump impeller 11 configured to be rotated around a center axis X by a drive force of a drive source such as an engine (not shown), a turbine impeller 12 configured to be rotated around the center axis X by flow of a fluid generated by rotation of the pump impeller 11, a stator 13 configured to deflect a flow of hydraulic oil flowing into the pump impeller 11 from the turbine impeller 12, and a cover member 14 connected to the pump impeller 11 to cover an outer side of the turbine impeller 12. The hydraulic oil is circulated in the torque converter 10 by rotation of three impellers, that is, the pump impeller 11, the turbine impeller 12, and the stator 13.

Inside the torque converter 10, a lock-up clutch 20 capable of mechanically coupling the cover member 14 and the turbine impeller 12 to each other, an output member 30 configured to be rotated around the center axis X integrally with the turbine impeller 12 and coupled to an output shaft, and an intermediate member 40 interposed between a primary spring 28 attached to the lock-up clutch 20 and a secondary spring 38 attached to the output member 30 to hold the output member 30 are disposed. The primary spring 28 and the secondary spring 38 are coupled to each other in series dynamically.

Next, components of the torque converter 10 are described in more detail. The pump impeller 11 is fixed to the cover member 14 by welding. The cover member 14 is coupled with a drive shaft (engine crankshaft) (not shown) to which the drive force of the drive source is transmitted, and is rotated around the center axis X as the drive shaft rotates. The pump impeller 11 includes a bowl-shaped outer pump shell 11a, an inner pump core ring 11b, and a plurality of pump blades 11c having base ends fixed to the pump core ring 11b. An outer peripheral end of the pump shell 11a is fixed to the cover member 14. Then, an inner peripheral end of the pump shell 11a is fixed to a pump hub 15. With this configuration, the pump impeller 11 is annularly formed and is rotated around the center axis X. An output shaft (not shown) is disposed to be rotatable around the center axis X in the pump hub 15. The output shaft is coupled to an input shaft of a transmission (not shown), which is a driven shaft.

The turbine impeller 12 is disposed opposite to the pump impeller 11 and includes a fluid inlet disposed close to a fluid outlet of the pump impeller 11. The turbine impeller 12 includes a bowl-shaped outer turbine shell 12a, an inner turbine core ring 12b, and a plurality of turbine blades 12c having base ends fixed to the turbine core ring 12b.

The stator 13 is disposed so as to be held between the pump impeller 11 and the turbine impeller 12. The stator 13 includes an inner core-side ring 13a, an outer shell-side ring 13b, and a plurality of stator blades 13c having base ends fixed to the core-side ring 13a. Each stator blade 13c is fixed to an outer peripheral surface of the core-side ring 13a and extends outward in the radial direction. The stator 13 is supported on a fixed shaft unrotatably supported by a housing (not shown) via a one-way clutch 17. Further, a thrust bearing 18 is disposed in the axial direction between the pump hub 15 and the core-side ring 13a and between a turbine hub 16 and the core-side ring 13a.

The lock-up clutch 20 includes a disc-shaped input-side plate 21 disposed between the cover member 14 and the turbine impeller 12, a friction plate 22 fixed onto a surface of the input-side plate 21 on the side of the cover member 14 on the outer side in the radial direction, a plurality of primary springs 28, and a hydraulic circuit (not shown). The hydraulic circuit is configured to cause the input-side plate 21 to slide in the axial direction by varying internal hydraulic pressure of the torque converter 10.

The input-side plate 21 is axially supported on an outer peripheral surface of the turbine hub 16 so as to be slidable in the axial direction and rotatable around the center axis X on an outer periphery of the turbine hub 16. When the friction plate 22 of the input-side plate 21 comes in contact with the cover member 14, the input-side plate 21 is rotated integrally with the cover member 14.

Hydraulic pressure on right and left sides of the input-side plate 21 may be varied by a hydraulic circuit to engage or disengage the lock-up clutch 20. Specifically when hydraulic pressure in a left chamber of the input-side plate 21 is lowered by the hydraulic circuit, hydraulic pressure in a right chamber of the input-side plate 21 becomes relatively high, and the input-side plate 21 moves in the left direction. Then, when pressure difference between left and right chambers is increased, the friction plate 22 comes in contact with the cover member 14 and causes the lock-up clutch 20 to be engaged. This makes possible that the cover member 14 and the input-side plate 21 are rotated integrally. Meanwhile, if hydraulic pressure in the left chamber of the input-side plate 21 is increased by the hydraulic circuit, the input-side plate 21 moves in the right direction of the drawing. In this case, the friction plate 22 is not in contact with the cover member 14, and the lock-up clutch 20 is in a released state and allows the cover member 14 and the input-side plate 21 to be rotated independently from each other.

Peripheral members of the plurality of primary springs 28 are described in more detail. The primary spring 28 is a spirally wound coil spring that serves as a damper mechanism interposed between the lock-up clutch 20 and the intermediate member 40. The plurality of primary springs 28 are disposed in the circumferential direction at the same diameter positions with the center axis X as a center outside the lock-up clutch 20 in the radial direction.

A holding plate 23 located closer to the turbine impeller 12 than the input-side plate 21 and a primary holding unit 24 holding both circumferential ends of the primary spring 28 are provided around primary springs 28 of the lock-up clutch 20.

The holding plate 23 has a disc-like shape and is fixed to the input-side plate 21 with a rivet 25. The holding plate 23 includes a plurality of spring housing parts 23a for housing one end of the plurality of primary springs 28 at an outer edge part in the radial direction thereof. Meanwhile, a spring housing part 21a for housing the other end of the plurality of primary springs 28 is disposed at the position of the input-side plate 21 located opposite to the spring housing parts 23a of the holding plate 23. Thus, one or more primary springs 28 are housed within a space formed by the spring housing part 21a on the side of the input-side plate 21 and spring housing parts 23a on the holding plate 23 located opposite to each other.

The primary holding unit 24 holding both circumferential ends of the primary springs 28 is formed at intervals in the circumferential direction on the holding plate 23. The primary holding unit 24 projects outward in the form of a claw in the radial direction from a portion fixed to the input-side plate 21 and holds the primary spring 28 when the side face of the primary holding unit 24 is in contact with both ends of the primary spring 28. Locking claws 46 projecting in the axial direction from the intermediate member 40 toward the input-side plate 21 enter between multiple primary springs 28 and contact each other. Thus, the primary springs 28 is held with each of both circumferential ends thereof in contact with the primary holding unit 24 of the holding plate 23 or the locking claw 46 of the intermediate member 40.

The output member 30 is an annular plate-shaped member, and a plurality of secondary springs 38 are attached into a plurality of secondary holding holes 32 formed in an output member main body 31. An inner circumferential side end part of the output member main body 31 of the output member 30 is fixed to the turbine hub 16. The output member 30 is held by a base plate 41 and a lid 42 of the intermediate member 40 along with a first dynamic vibration absorber 50 and a second dynamic vibration absorber 60 (described later) and fixed to the turbine hub 16. Thus, the output member 30 is fixed integrally with the output shaft.

The secondary spring 38 is a spirally wound coil spring that serves as a damper mechanism interposed between the intermediate member 40 and the output member 30. The plurality of secondary springs 38 are disposed in the circumferential direction of the output member 30 at the same diameter positions with the center axis X as a center. The secondary spring 38 is held within the output member main body 31 with both ends thereof abutted against and supported on a side face 32a of the secondary holding hole 32. Each of the plurality of secondary springs 38 is housed within a space formed by the spring housing part 41a on the side of the base plate 41 and the spring housing part 42a on the side of the lid 42, that face each other.

(Structure of Dynamic Vibration Absorber)

Figure 2:
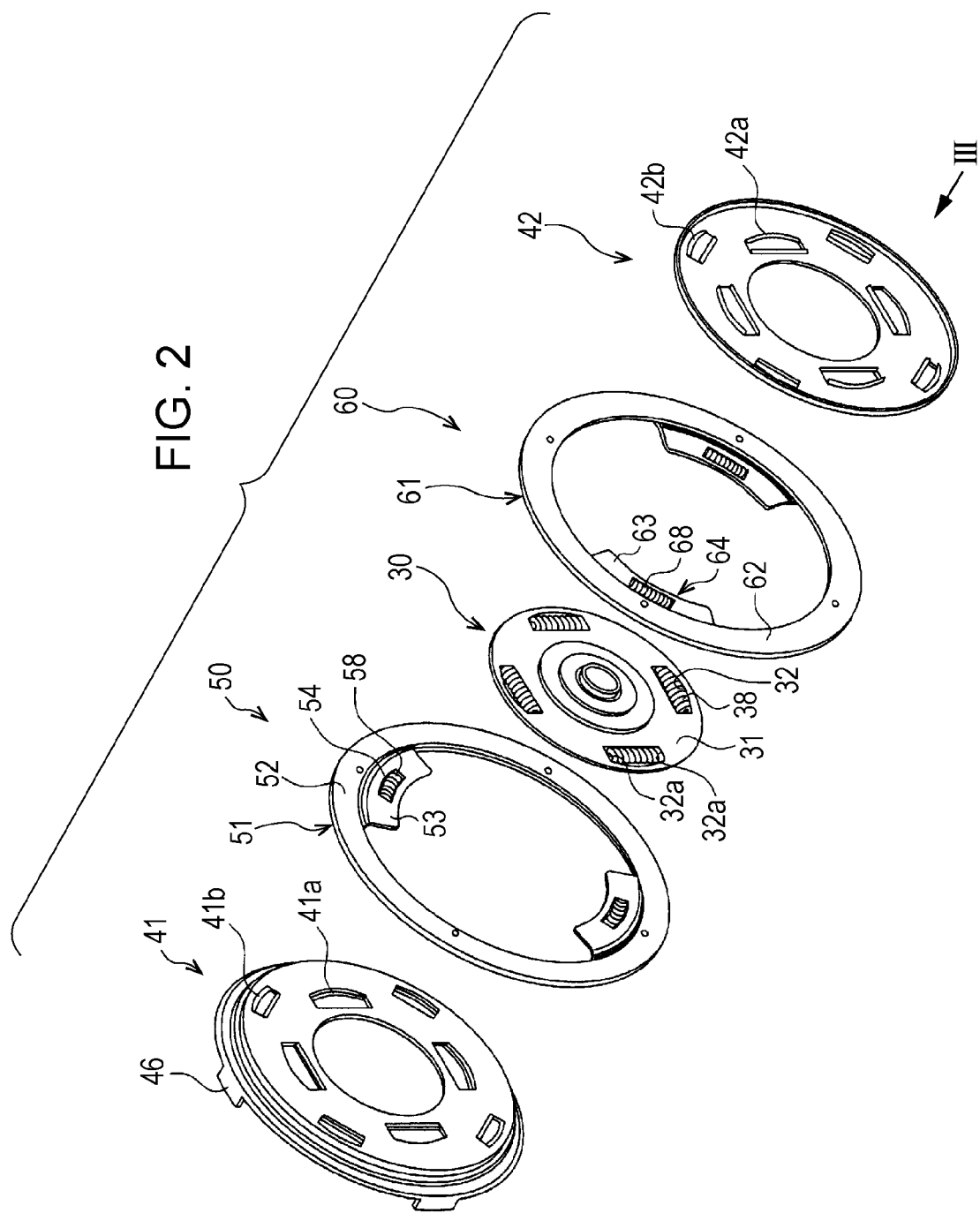
FIG. 2 is an exploded perspective view of a structure of dynamic vibration absorber fixed to an intermediate member according to the first embodiment.

Next, structure of the dynamic vibration absorber according to the first embodiment and the intermediate member 40 fixing the dynamic vibration absorber is described. FIG. 2 is an exploded perspective view illustrating a structure of the dynamic vibration absorber fixed to the intermediate member 40 according to the first embodiment. As illustrated in FIG. 1 and FIG. 2, the dynamic vibration absorber according to the present embodiment includes the annular plate-shaped first dynamic vibration absorber 50 and the annular plate-shaped second dynamic vibration absorber 60. The dynamic vibration absorber is attached to the intermediate member 40 including the base plate 41 and the lid 42 and fixed integrally with a rivet 35 (see FIG. 1).

As illustrated in FIG. 2, on the base plate 41 of the intermediate member 40, a damper housing part 41b projecting toward the lock-up clutch 20 is disposed for supporting one end of each of a first damper member 58 and a second damper member 68, and a locking claw 46 projecting from an outer diameter end of the base plate main body toward the input-side plate 21 is disposed at an annular plate-shaped base plate main body. On the lid 42 of the intermediate member 40, a damper housing part 42b projecting toward the turbine impeller 12 is disposed on an annular plate-shaped lid main body for supporting the other end of each of the first damper member 58 and the second damper member 68.

The damper housing part 41b of the base plate 41 and the damper housing part 42b of the lid 42 are disposed on sections facing each other. Thus, the first damper member 58 and the second damper member 68 are housed in a space formed by the damper housing part 41b and the damper housing part 42b. Thus, movement of the first damper member 58 and the second damper member 68 in the axial direction is restricted. Positions of the damper housing parts 41b, 42b in the radial direction are closer to the inner diameter side than the spring housing parts 21a, 23a for housing primary springs 28 and closer to the outer diameter side than spring housing parts 41a, 42a for housing the secondary springs 38. The secondary spring 38 according to the present embodiment attached to the output member 30 is disposed at four positions at equal intervals in the circumferential direction. However, the number of the secondary springs 38 is not limited thereto.

The dynamic vibration absorber fixed to the intermediate member 40 according to the present embodiment includes two members, that is, the first dynamic vibration absorber 50 and the second dynamic vibration absorber 60. The first dynamic vibration absorber 50 includes a first mass body 51 including an annular plate-shaped first mass main body 52 with the center axis X as a center, and a plate-shaped first projecting plate 53 projecting from the first mass main body 52 to the inner diameter side. A first holding hole 54 for holding the first damper member 58 inside to restrict movements of both sides of the first damper member 58 in the elastic deformation direction is formed in the first projecting plate 53. The first holding hole 54 is formed longitudinally in the circumferential direction with the center axis X as a center. The first dynamic vibration absorber 50 includes a second mass body 61 including an annular plate-shaped second mass main body 62 with the center axis X as a center, and a plate-shaped second projecting plate 63 projecting from the second mass main body 62 to the inner diameter side. A second holding hole 64 for holding the second damper member 68 inside to restrict movements of both sides of the second damper member 68 in the elastic deformation direction is formed in the second projecting plate 63. The second holding hole 64 is formed longitudinally in the circumferential direction with the center axis X as a center.

With this configuration, when assembling the first dynamic vibration absorber 50 and the second dynamic vibration absorber 60 according to the first embodiment into the intermediate member 40, the members are placed in the order illustrated in FIG. 2. That is, the first dynamic vibration absorber 50 including the first damper member 58 is placed on the base plate 41. Next, the output member 30 including the secondary springs 38 is placed, and then the second dynamic vibration absorber 60 including the second damper member 68 is placed. Then, the lid 42 is placed finally. Thus, the two dynamic vibration absorbers, that is, the first dynamic vibration absorber 50 and the second dynamic vibration absorber 60 are held by the base plate 41 and the lid 42 forming the intermediate member 40, and the output member 30 is disposed inside the two dynamic vibration absorbers. Then, the output member 30, the first dynamic vibration absorber 50 and the second dynamic vibration absorber 60 are held integrally with respect to the intermediate member 40 by the rivets 35 (see FIG. 1 (omitted in FIG. 2)) penetrating through the members including the intermediate member 40.

Here, the first projecting plate 53 of the first mass body 51 and the second projecting plate 63 of the second mass body 61 are disposed so as to have circumferential direction phases different from each other. According to the present embodiment, two first projecting plates 53 projecting from the first mass main body 52 are positioned so as to face each other with a phase difference of 180 degrees in the circumferential direction. Two second projecting plates 63 projecting from the second mass main body 62 are positioned so as to face each other with a phase difference of 180 degrees in the circumferential direction. Then, the first projecting plate 53 and the second projecting plate 63 are disposed such that an adjoining first projecting plate 53 and an adjoining second projecting plate 63 have a phase difference of 90 degrees in the circumferential direction when assembled into the intermediate member 40.

Figure 3:
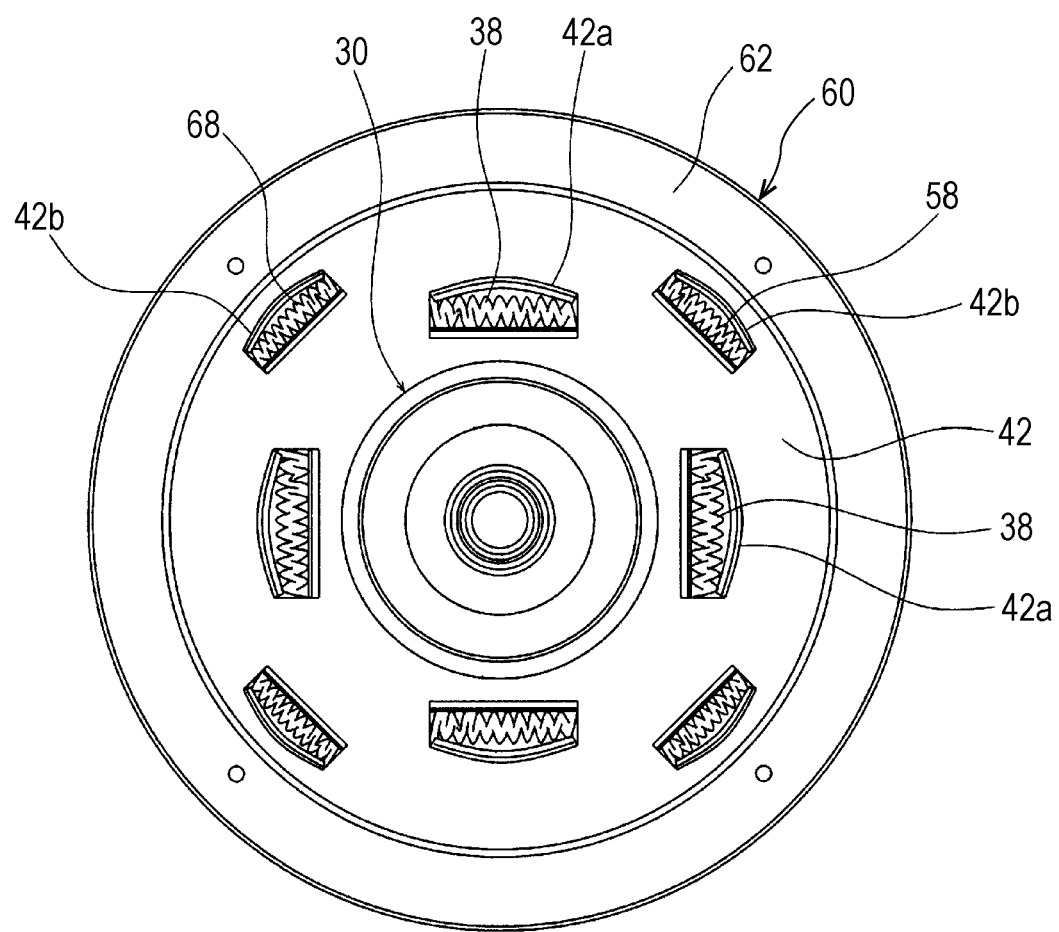
FIG. 3 is a side view illustrating the dynamic vibration absorber assembled into the intermediate member according to the first embodiment.

FIG. 3 is a side view illustrating the dynamic vibration absorber according to the first embodiment assembled into the intermediate member 40. FIG. 3 illustrates members of FIG. 2 assembled and viewed from the direction of arrow III in the axial direction. In a state where the output member 30, the first dynamic vibration absorber 50 and the second dynamic vibration absorber 60 are fixed to the intermediate member 40, the first mass body 51 of the first dynamic vibration absorber 50 and the second mass body 61 of the second dynamic vibration absorber 60 are positioned at the outermost diameter, and the intermediate member 40 onto which other members are fixed and disposed and the output member 30 fixed to the output shaft are disposed toward the inner diameter.

In the present embodiment, the first holding hole 54 of the first dynamic vibration absorber 50 for holding the first damper member 58 and damper housing parts 41b, 42b of the intermediate member 40, and the second holding hole 64 of the second dynamic vibration absorber 60 for holding the second damper member 68 and damper housing parts 41b, 42b of the intermediate member 40 are formed at positions of the same diameter position as viewed from the center axis X (see FIG. 2). Thus, with the intermediate member 40 in an assembled state, the first damper member 58 and the second damper member 68 are formed at positions of the same diameter position as viewed from the center axis X, as illustrated in FIG. 3.

(Set Frequency of Dynamic Vibration Absorber)

Figure 4:
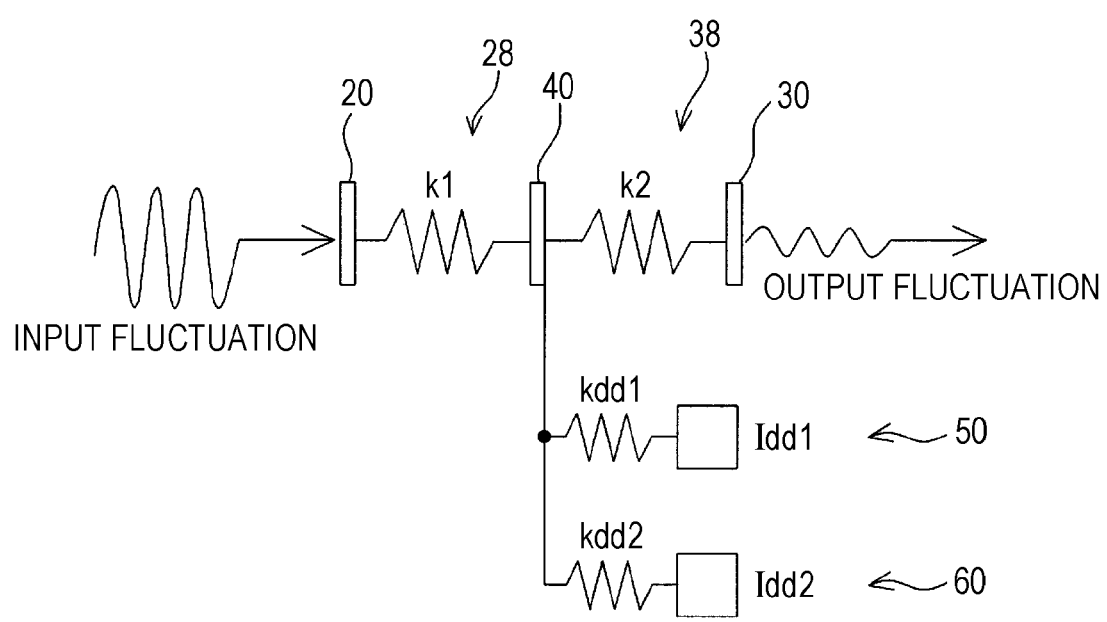
FIG. 4 is a simplified vibration model diagram of a drive system coupled with the torque converter.

Next, set frequency (set rotation frequency) of the dynamic vibration absorber according to the present embodiment is described. FIG. 4 is a simplified vibration model diagram of a drive system coupled with the torque converter 10. The dynamic vibration absorber is generally called a dynamic damper and includes a mass body and a spring. The dynamic model of the dynamic vibration absorber may be expressed with the inertial moment I and the spring constant k. In the description below, a reference numeral dd1 is assigned to a value related to the first dynamic vibration absorber 50, and a reference numeral dd2 is assigned to a value related to the second dynamic vibration absorber 60. Thus, set frequency of the first dynamic vibration absorber 50 is represented by a first set frequency fdd1, and set frequency of the second dynamic vibration absorber 60 is represented by a second set frequency fdd2.

As illustrated in FIG. 4, with the torque converter 10 in a coupled state, primary springs 28 attached to the lock-up clutch 20 and secondary springs 38 attached to the output member 30 are connected in series on the dynamic model via the intermediate member 40. Two dynamic vibration absorbers, that is, the first dynamic vibration absorber 50 and the second dynamic vibration absorber 60 are connected in parallel with respect to the intermediate member 40 on the dynamic model by assembling into the intermediate member 40 as above.

Then, in the present embodiment, the first set frequency fdd1 of the first dynamic vibration absorber 50 and the second set frequency fdd2 of the second dynamic vibration absorber 60 are different from each other. Further, the ratio between the first set frequency fdd1 and the second set frequency fdd2 is confined in a specific range. Specifically, a large set frequency fH is less than 1.2 times of a small set frequency fL. This may be expressed with a mathematical formula as below. First, the first set frequency fdd1 and the second set frequency fdd2 of the second dynamic vibration absorber 60 may be expressed with the following formula.

$$fdd1 = \frac{1}{2\pi}\sqrt{\frac{kdd1}{Idd1}}, fdd2 = \frac{1}{2\pi}\sqrt{\frac{kdd2}{Idd2}}$$

Here, when the relation between the first set frequency fdd1 and the second set frequency fdd2 is fdd1<fdd2, the large set frequency fH=fdd2, and the small set frequency fL=fdd1. Then, the set frequencies are set such that the set frequency ratio fH/fL is within the following range.

$$1.0 < \frac{fH}{fL} < 1.2$$

In the above formula, the spring constant of the first dynamic vibration absorber 50 is represented by kdd1, and the inertial moment thereof is represented by Idd1. The spring constant of the second dynamic vibration absorber 60 is represented by kdd2, and the inertia moment thereof is represented by Idd2. In the above example, the second set frequency fdd2 is assumed to be higher than the first set frequency fdd1. However, the relation between the set frequencies is not limited thereto, and the second set frequency fdd2 may be set to a value lower than the first set frequency fdd1.

As described above, in this embodiment, the value of the set frequency ratio fH/fL is set. Here, a specific setting value of the first set frequency fdd1 and the second set frequency fdd2 and relation of damping performance thereof are described with reference to FIG. 5 to FIG. 8. In the below description using those figures, out of the first set frequency fdd1 and the second set frequency fdd2 having values different from each other, a smaller value represents the set frequency fL, and a larger value represents the set frequency fH. Necessary damping performance is assumed to be Dn [dB], and a usable critical point is indicated with a broken line. A graph related to a corresponding set frequency ratio in respective figures is indicated by a thick solid line, and for reference, a measurement result with the dynamic vibration absorber not attached is indicated by a dash line, and a measurement result with one dynamic vibration absorber is indicated by a two-dot chain line as a comparative example. The set frequency of the dynamic vibration absorber of the comparative example is Nx [rpm].

Figure 5:
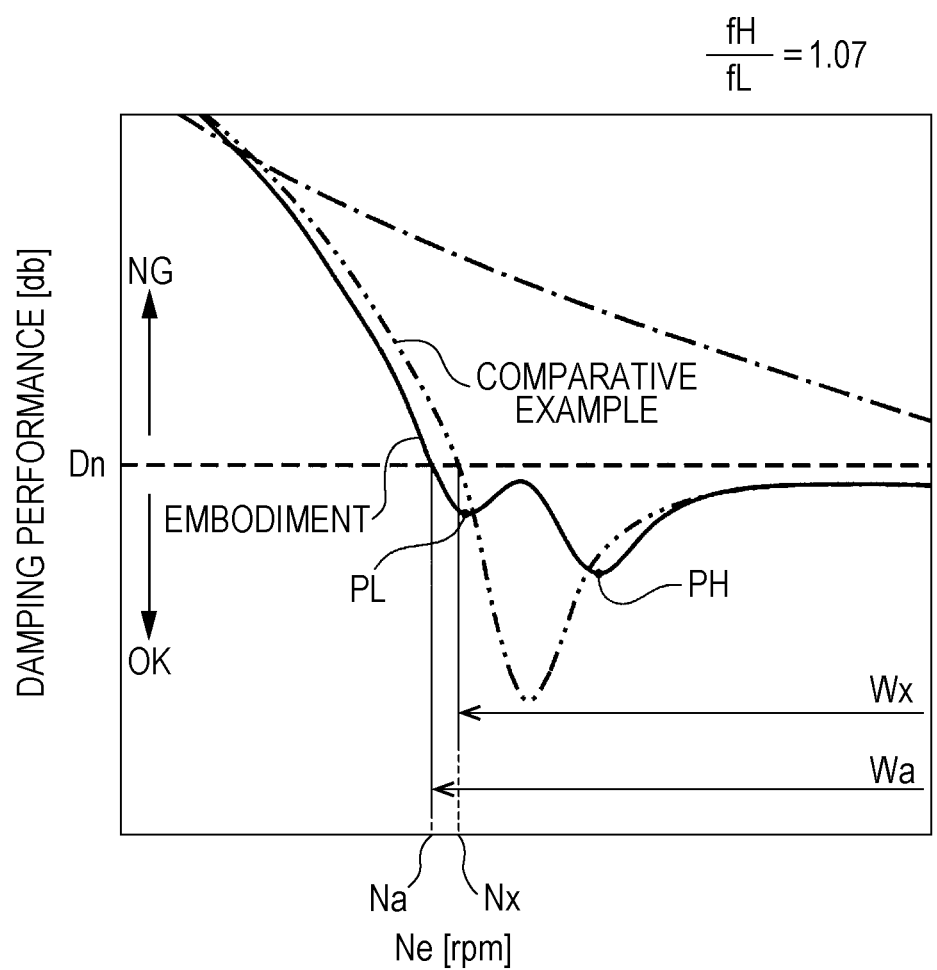
FIG. 5 illustrates damping performance of a dynamic vibration absorber with respect to the input rotation frequency when $fH/fL=1.07$.

FIG. 5 is a diagram illustrating the damping performance of the dynamic vibration absorber with respect to the input rotation frequency when fH/fL=1.07. In this configuration, the inertial moment Idd1 of the first dynamic vibration absorber 50 and the inertial moment Idd2 of the second dynamic vibration absorber 60 are set to the same value such that total inertia moment of the first dynamic vibration absorber 50 and the second dynamic vibration absorber 60 is the same value as the comparative example, and the spring constant kdd1 and the spring constant kdd2 are adjusted so as to get fH/fL=1.07. In this case, as illustrated in FIG. 5, a first damping effect appears at a point PL close to the set frequency fL, and a second damping effect appears at a point PH close to the set frequency fH.

As described above, assuming that necessary damping performance is lower than Dn [dB], when one dynamic vibration absorber is attached to the intermediate member as in the comparative example, the usable range Wx satisfying the necessary damping performance is about Nx [rpm] or higher. In contrast, when two dynamic vibration absorbers are attached to the intermediate member 40 and set frequencies are different from each other as in the present embodiment, the damping effect appears at two points (point PL and point PH) and therefore the damping effect also may be recognized at a frequency close to the two points. As a result, necessary damping performance is satisfied even at a lower frequency, and thereby the usable range Wa satisfying necessary damping performance becomes wider to the low frequency side. Also, in FIG. 5, the usable range Wa according to the present embodiment is about Na [rpm] or more and thus becomes wider.

Figure 6:
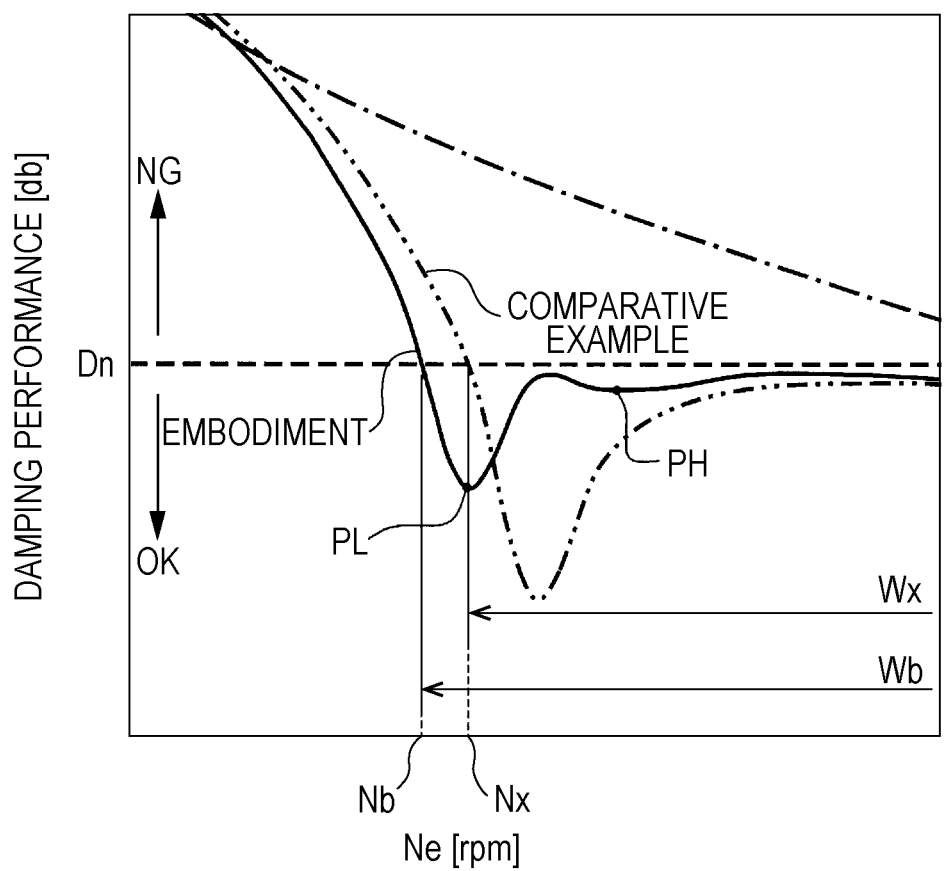
FIG. 6 illustrates damping performance of the dynamic vibration absorber with respect to the input rotation frequency when $fH/fL=1.10$.

FIG. 6 is a diagram illustrating the damping performance of the dynamic vibration absorber with respect to the input rotation frequency when fH/fL=1.10. In this configuration, total inertia moment of the first dynamic vibration absorber 50 and the second dynamic vibration absorber 60 is made the same value as the comparative example, and the inertial moment Idd1 of the first dynamic vibration absorber 50 and the inertial moment Idd2 of the second dynamic vibration absorber 60 are set so as to get the relation of Idd1>Idd2. Based on this setting, the spring constant kdd1 and the spring constant kdd2 are adjusted to get fH/fL=1.10.

In this case, as illustrated in FIG. 6, a first damping effect appears at a point PL close to the set frequency fL, and a second damping effect appears at a point PH close to the set frequency fH. Again, the usable range Wx in the comparative example is Nx [rpm], but when the set frequency ratio between two dynamic vibration absorbers are set to fH/fL=1.10, necessary damping performance was satisfied even at a lower frequency. Specifically, the usable range Wb in this configuration is about Nb [rpm] or more and thus further becomes wider.

Figure 7:
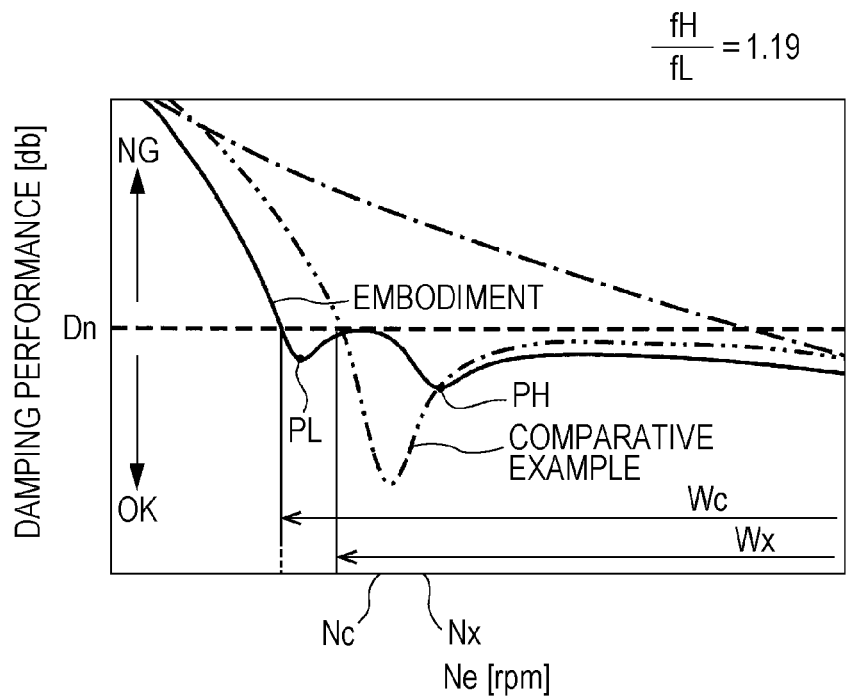
FIG. 7 illustrates damping performance of the dynamic vibration absorber with respect to the input rotation frequency when $fH/fL=1.19$.

FIG. 7 is a diagram illustrating the damping performance of the dynamic vibration absorber with respect to the input rotation frequency when fH/fL=1.19. Again in this configuration, a first damping effect appears at a point PL close to the set frequency fL, and a second damping effect appears at a point PH close to the set frequency fH. Again, this configuration satisfied necessary damping performance even at a lower frequency. Specifically, the usable range We in this configuration is Nc [rpm] or more. Since Nc is a value smaller than Nb, it may be said that the usable range further becomes wider.

Figure 8:
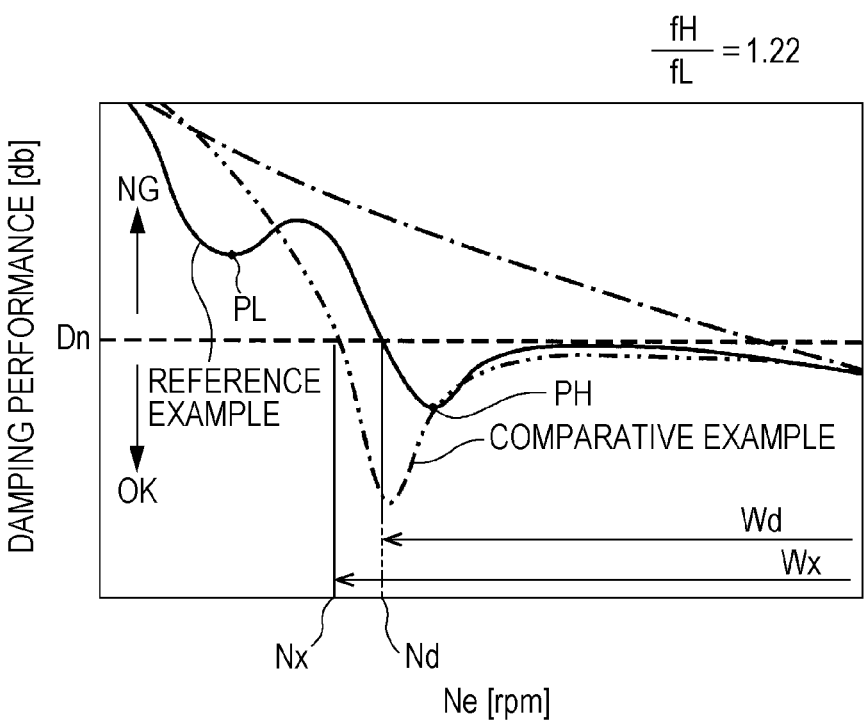
FIG. 8 illustrates the damping performance of the dynamic vibration absorber with respect to the input rotation frequency when $fH/fL=1.22$ (reference example).

FIG. 8 is a diagram illustrating the damping performance of the dynamic vibration absorber with respect to the input rotation frequency when fH/fL=1.22 (reference example). Again in the configuration of the reference example, the damping performance may be verified at the point PL and the point PH similarly with the above. However, in the reference example, the damping performance at the point PL close to the set frequency fL does not reach the necessary damping performance Dn [dB]. Also, the damping performance may be reduced in a frequency band between the set frequency fL and the set frequency fH, and necessary damping performance is not satisfied until input rotation frequency becomes high again in the course reaching the point PH close to the set frequency fH. Specifically, the usable range Wd in this configuration is Nd [rpm] or more. Since Nd is a value larger than Nx, the usable range in this configuration comes narrower than the usable range Wx in the comparative example.

As described above, it may be understood that wider usable ranges Wa to We is obtained when the first set frequency fdd1 of the first dynamic vibration absorber 50 and the second set frequency fdd2 of the second dynamic vibration absorber 60 are different from each other and the set frequency ratio fH/fL is confined in a predetermined range for obtaining necessary damping performance. Then, it may be understood from the above measurement results that the predetermined range is required to be 1.0<fH/fL<1.2 although depending on the necessary damping performance. To obtain an effect that the usable range is widened with respect to the comparative example in a more remarkable manner, it is preferable that the set frequency ratio is set to about 1.01≤fH/fL≤1.19.

As described above, according to the torque converter 10 of the present embodiment where an intermediate member 40 is disposed between so-called twin dampers formed by a primary spring 28 and a secondary spring 38 coupled to each other in series, and a dynamic vibration absorber is attached to the intermediate member 40, when the intermediate member 40 vibrates, the dynamic vibration absorber vibrates in a reverse phase to the vibration of the intermediate member 40, and the intermediate member 40 and the dynamic vibration absorber cancel mutual vibrations. Thus, damping performance may be exhibited in an efficient manner.

Since the dynamic vibration absorber attached to the intermediate member 40 includes two dynamic vibration absorbers, that is, the first dynamic vibration absorber 50 and the second dynamic vibration absorber 60, and set frequencies of the first dynamic vibration absorber 50 and the second dynamic vibration absorber 60 are different from each other, damping performance may be obtained even in a frequency range between the first set frequency fdd1 of the first dynamic vibration absorber 50 and the second set frequency fdd2 of the second dynamic vibration absorber 60. Thus, compared with an example where only one dynamic vibration absorber is attached, damping performance may be exhibited in a wider frequency band, and wider usable ranges Wa to We may be obtained.

Since two dynamic vibration absorbers, that is, the first dynamic vibration absorber 50 and the second dynamic vibration absorber 60 are attached to the intermediate member 40, there is no need to add a new member to the pump impeller 11 and the turbine impeller 12 and thereby an increase in size of the device may be suppressed. Thus, the torque converter 10 including a damper mechanism exhibiting damping performance in a wide frequency band may be provided without enlarging the device.

In the above torque converter 10, the base plate 41 and the lid 42 of the intermediate member 40 and two dynamic vibration absorbers, that is, the first dynamic vibration absorber 50 and the second dynamic vibration absorber 60 are constituted in an annular plate shape, and all of those components are integrally held on the same axis as the center axis X of the output member 30. Thus, axial direction width may be reduced, and thereby the space may be saved.

Also, in the above torque converter 10, when the first set frequency fdd1 of the first dynamic vibration absorber 50 and the second set frequency fdd2 of the second dynamic vibration absorber 60 are different from each other, and the higher set frequency fH is less than 1.2 times of the lower set frequency fL, since there is not so much difference between the set frequencies, damping performance may be obtained in a frequency band between the first set frequency fdd1 of the first dynamic vibration absorber 50 and the second set frequency fdd2 of the second dynamic vibration absorber 60 in a reliable manner.

Second Embodiment

Hereinafter, embodiments of the present disclosure are described in detail with reference to the accompanying drawings. In a configuration having the same feature as the above embodiment, description thereof is omitted by assigning the same reference numeral. The second embodiment is different from the first embodiment only in a specific configuration of the intermediate member 40, the first dynamic vibration absorber 50 and the second dynamic vibration absorber 60. Thus, description of the overall configuration of the above torque converter and description of set frequencies of the dynamic vibration absorber are omitted, and hereinafter, only the structure of the dynamic vibration absorber is described.

(Structure of Dynamic Vibration Absorber)

Figure 9:
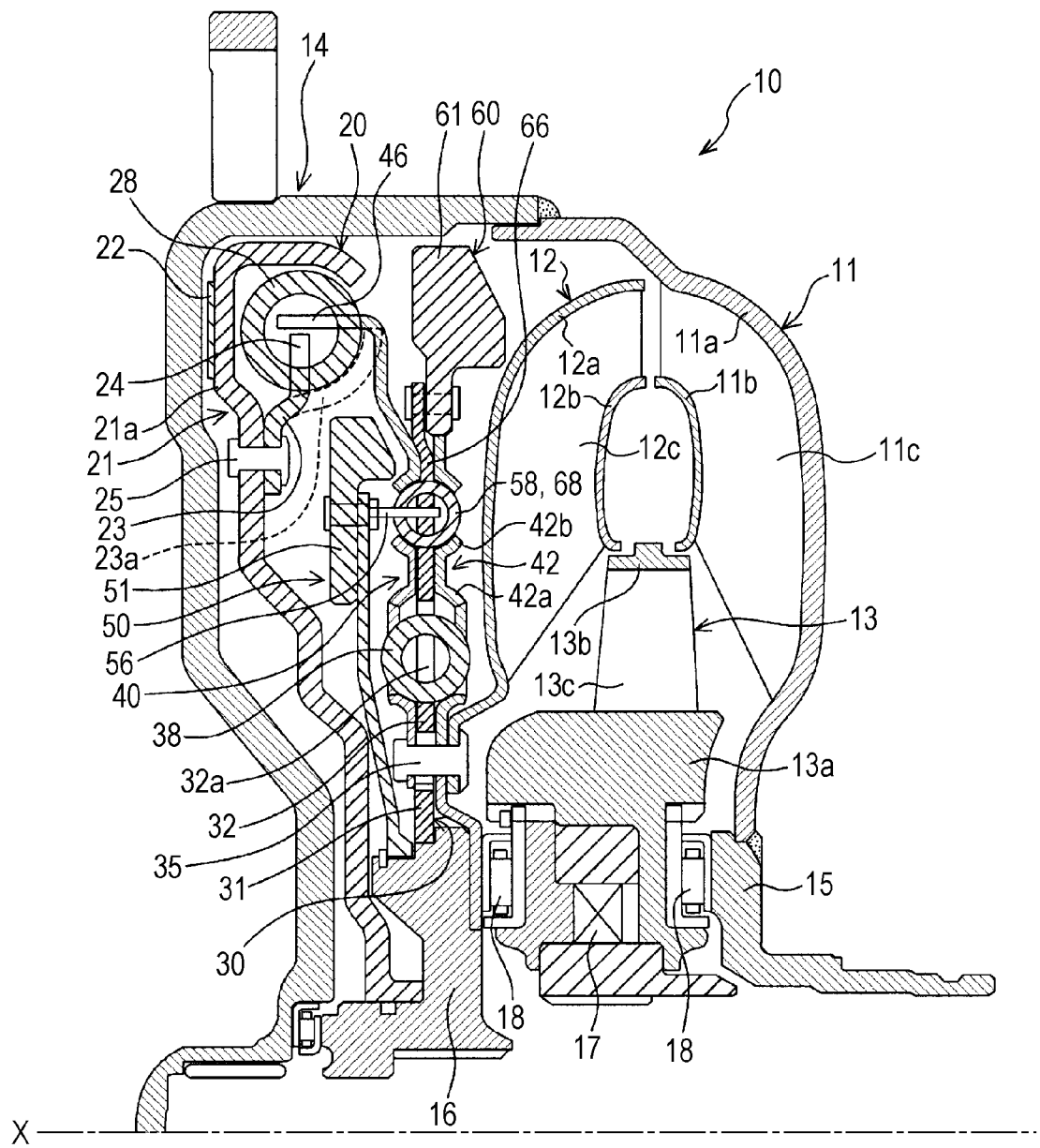
FIG. 9 is an overall schematic diagram of a torque converter according to a second embodiment.

A structure of the dynamic vibration absorber according to the second embodiment and the intermediate member 40 to which the dynamic vibration absorber is fixed are described. FIG. 9 is an overall schematic diagram of the torque converter 10 according to the second embodiment. As illustrated in FIG. 9, the dynamic vibration absorber according to the present embodiment includes an annular plate-shaped first dynamic vibration absorber 50 and an annular plate-shaped second dynamic vibration absorber 60. The dynamic vibration absorber is attached to the intermediate member 40 including the base plate 41 and the lid 42 and fixed integrally with a rivet 35.

Figure 10:
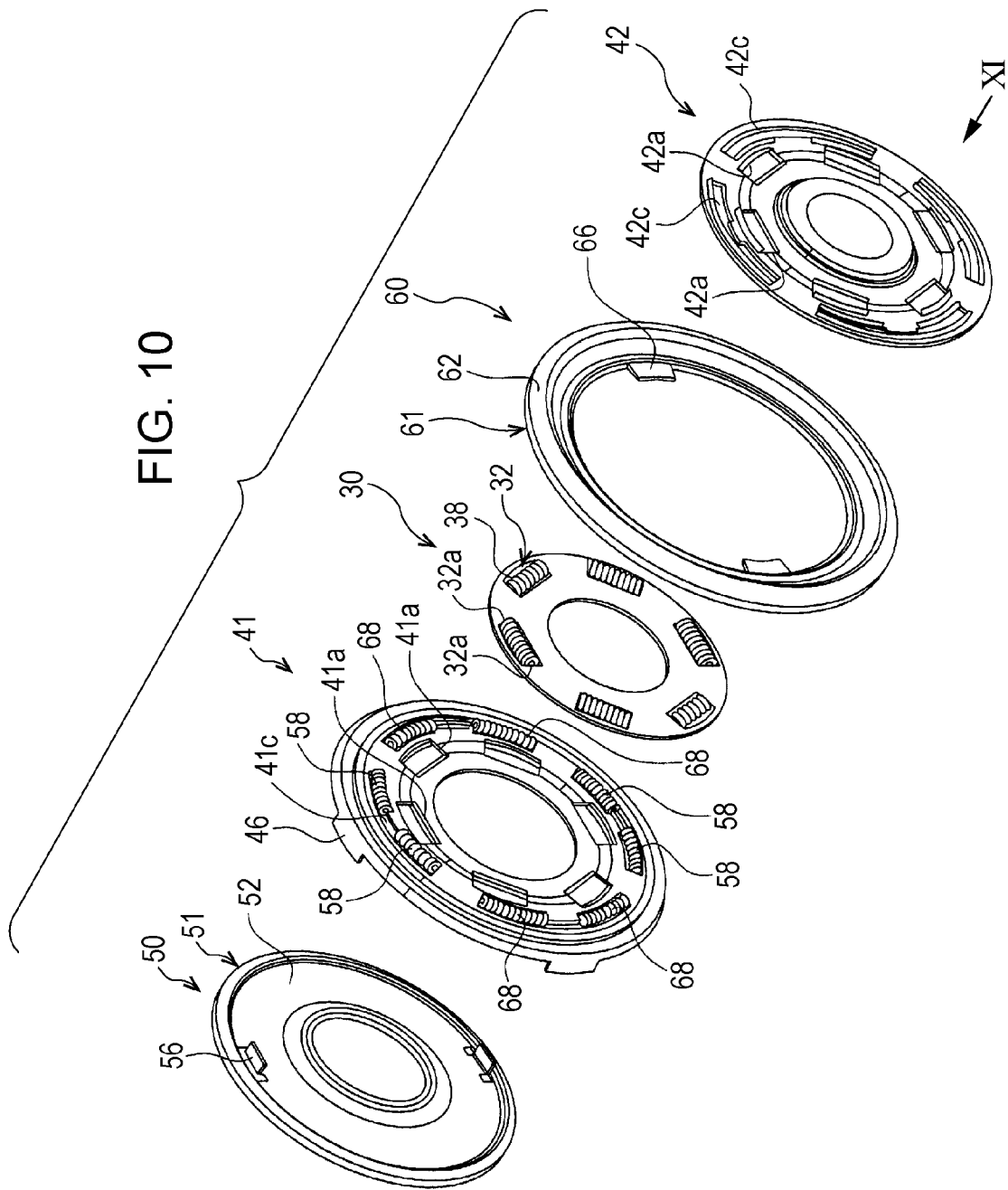
FIG. 10 is an exploded perspective view of a dynamic vibration absorber fixed to an intermediate member according to the second embodiment.

FIG. 10 is an exploded perspective view of the dynamic vibration absorber fixed to the intermediate member according to the second embodiment. As illustrated in FIG. 10, on the base plate 41 of the intermediate member 40, a damper housing part 41c projecting toward the lock-up clutch 20 is formed for supporting one end of each of a plurality of first damper members 58 and a plurality of second damper members 68 on an annular plate-shaped lid main body, and a locking claw 46 projecting from the outer diameter end of the base plate main body toward the input-side plate 21 is disposed. On a lid 42 of the intermediate member 40, a damper housing part 42c projecting toward the turbine impeller 12 is formed for supporting the other end of each of the first damper member 58 and the second damper member 68 on an annular plate-shaped lid main body.

The damper housing part 41c of the base plate 41 and the damper housing part 42c of the lid 42 are disposed on sections facing each other. Thus, the first damper member 58 and the second damper member 68 are housed in a space formed by the damper housing part 41c and the damper housing part 42c. The damper housing part 41c according to the present embodiment has an elongated hole constituted longitudinally in the circumferential direction, and circumferential direction width of the elongated hole is formed to an extent enough to accommodate two first damper members 58 arranged in the circumferential direction and a first projecting claw 56 (described later) interposed therebetween. Similarly, the damper housing part 42c has an elongated hole constituted longitudinally in the circumferential direction, and circumferential direction width of the elongated hole is formed to an extent enough to accommodate two second damper members 68 arranged in the circumferential direction and a second projecting claw 66 (described later) interposed therebetween.

Movement of the first damper member 58 and the second damper member 68 in the axial direction is restricted as being held by the damper housing part 41c and the damper housing part 42c. Positions of the damper housing parts 41c, 42c in the radial direction are closer to the inner diameter side than spring housing parts 21a, 23a for housing primary springs 28 and closer to the outer diameter side than spring housing parts 41a, 42a for housing secondary springs 38. The secondary spring 38 according to the present embodiment attached to the output member 30 is disposed at six positions at equal intervals in the circumferential direction. However, the number of the secondary springs 38 is not limited thereto.

The dynamic vibration absorber according to the present embodiment fixed to the intermediate member 40 includes two members, that is, the first dynamic vibration absorber 50 and the second dynamic vibration absorber 60. The first dynamic vibration absorber 50 includes a first mass body 51 and a first damper member 58. The first mass body 51 includes an annular plate-shaped first mass main body 52 with the center axis X as a center, and a first projecting claw 56 projecting in the axial direction from the outer periphery of the first mass main body 52 toward the base plate 41. The first projecting claw 56 is interposed between two first damper members 58 arranged in the circumferential direction and held by a pair of damper housing parts 41c, 42c, and abuts on both of the two first damper members 58 in the circumferential direction. Thus, the two first damper members 58 are held by the pair of damper housing parts 41c, 42c with both circumferential ends and both axial ends thereof held on the damper housing parts 41c, 42c, and the circumferential direction between the two first damper members 58 held by the first projecting claw 56. In the present embodiment, two first damper members 58 are disposed at two positions facing each other. Thus, the first dynamic vibration absorber 50 has four first damper members 58 in total.

The second dynamic vibration absorber 60 includes a second mass body 61 and a second damper member 68. The second mass body 61 includes an annular plate-shaped second mass main body 62 with the center axis X as a center, the second mass main body having a diameter larger than the first mass body 51; and a second projecting claw 66 projecting from the second mass main body 62 to the inner diameter side. The second projecting claw 66 is interposed between two second damper members 68 arranged in the circumferential direction and held in a pair of damper housing parts 41c, 42c, and abuts on both of the two second damper members 68 in the circumferential direction. Thus, the two second damper members 68 are held by the pair of damper housing parts 41c, 42c with both circumferential ends and both axial ends thereof held on the damper housing parts 41c, 42c, and the circumferential direction between the two second damper members 68 held by the second projecting claw 66. In the present embodiment, two second damper members 68 are disposed respectively at two positions facing each other. Thus, the second dynamic vibration absorber 60 has four second damper members 68 in total.

With this configuration, when assembling the first dynamic vibration absorber 50 and the second dynamic vibration absorber 60 according to the second embodiment into the intermediate member 40, members are placed in the order illustrated in FIG. 10. That is, the first dynamic vibration absorber 50 is abutted on the base plate 41 while inserting the first projecting claw 56 from the side of the lock-up clutch 20 of the base plate 41 into the damper housing part 41c so as to be abutted on the first damper member 58. Next, the output member 30 including secondary springs 38 is placed on the base plate 41. Then, the second dynamic vibration absorber 60 is placed such that the second projecting claw 66 is abutted on the second damper member 68. Finally, the lid 42 is placed.

Thus, on the radial direction outside of the intermediate member 40 according to the second embodiment, the base plate 41 is held by the first dynamic vibration absorber 50 on the side of the lock-up clutch 20 of the base plate 41 and the second dynamic vibration absorber 60 on the side of the turbine impeller 12 of the base plate 41, and is covered with the radial direction outside of the lid 42. On the radial direction inner side of the intermediate member 40, the output member 30 placed on the base plate 41 is covered with the lid 42. Then, the output member 30, the first dynamic vibration absorber 50 and the second dynamic vibration absorber 60 are held integrally with respect to the intermediate member 40 by rivets 35 (see FIG. 9 (omitted in FIG. 10)) penetrating through the members including the intermediate member 40.

Here, the first projecting claw 56 of the first mass body 51 and the second projecting claw 66 of the second mass body 61 are disposed so as to have circumferential direction phases different from each other. In the present embodiment, two first projecting claws 56 projecting in the axial direction from the first mass main body 52 are positioned so as to face each other with a phase difference of 180 degrees in the circumferential direction. Two second projecting claws 66 projecting in the inner circumferential direction from the second mass main body 62 are positioned so as to face each other with a phase difference of 180 degrees in the circumferential direction. Then, the first projecting claw 56 and the second projecting claw 66 are disposed such that an adjoining first projecting claw 56 and an adjoining second projecting claw 66 have a phase difference of 90 degrees in the circumferential direction when assembled into the intermediate member 40.

Figure 11:
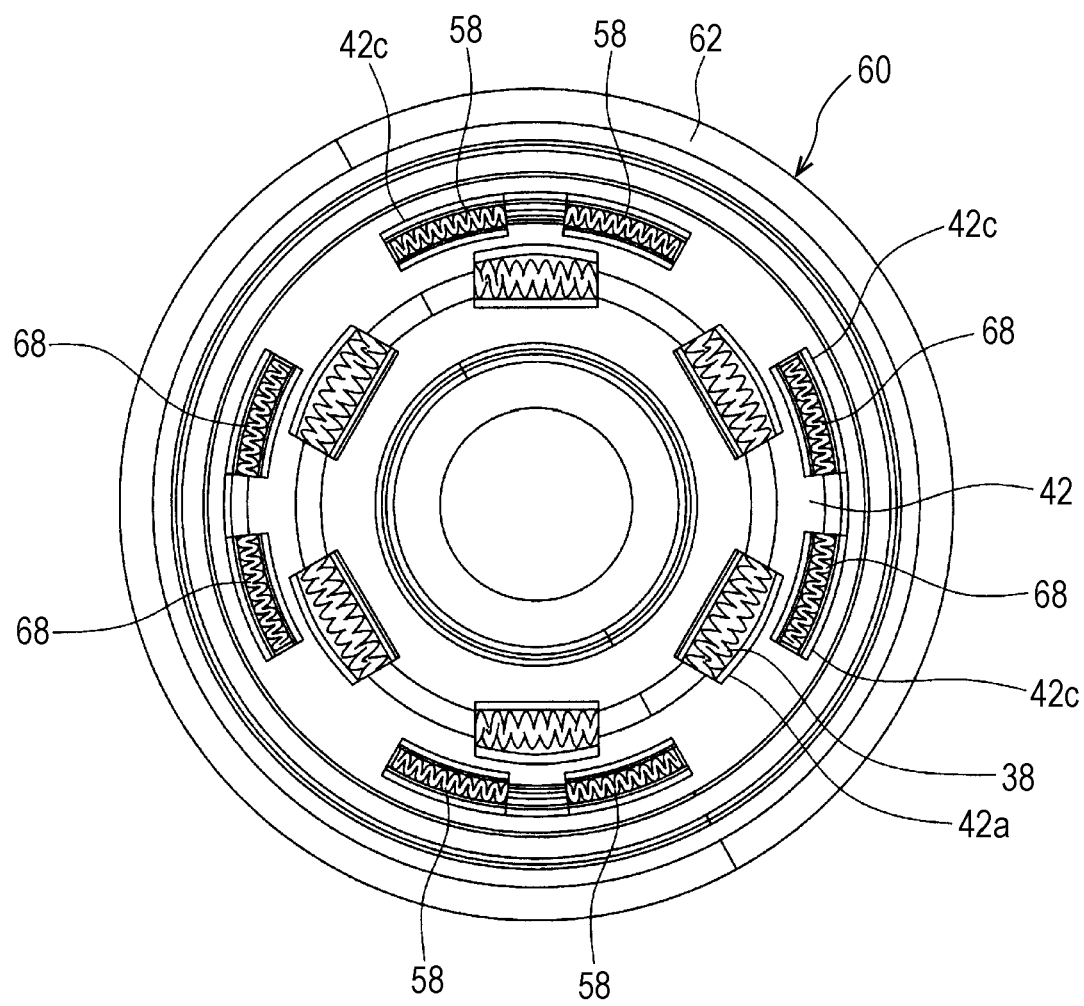
FIG. 11 is a side view illustrating the dynamic vibration absorber assembled into the intermediate member according to the second embodiment.

FIG. 11 is a side view illustrating the dynamic vibration absorber according to the second embodiment assembled into the intermediate member 40. FIG. 11 illustrates members of FIG. 10 assembled and viewed from arrow XI in the axial direction. In a state where the output member 30, the first dynamic vibration absorber 50 and the second dynamic vibration absorber 60 are fixed to the intermediate member 40, the first mass body 51 of the first dynamic vibration absorber 50 and the second mass body 61 of the second dynamic vibration absorber 60 are positioned at the outermost diameter, and the intermediate member 40 fixing other members and the output member 30 fixed to the output shaft are disposed toward the inner diameter.

In the present embodiment, the damper housing parts 41c, 42c of the intermediate member 40 for holding the first damper member 58, and the damper housing parts 41c, 42c of the intermediate member 40 for holding the second damper member 68 are formed at the same diameter position as viewed from the center axis X (see FIG. 10). Thus, with the intermediate member 40 in an assembled state, the first damper member 58 and the second damper member 68 are formed at the same diameter position as viewed from the center axis X as illustrated in FIG. 3.

As described above, the torque converter 10 according to the present embodiment includes a plurality of first damper members 58 and a plurality of second damper members 68, both held by the base plate 41, where a first projecting claw 56 projecting in the axial direction from a first mass main body 52 is abutted between the plurality of first damper members 58, and a second projecting claw 66 projecting in the circumferential direction from a second mass main body 62 is abutted between the plurality of second damper members 68. Here, the first mass body 51 and the second mass body 61 are disposed so as to have a circumferential direction phase different from the first projecting claw 56 and the second projecting claw 66. With this configuration, circumferential direction positions of the first projecting claw 56 and the second projecting claw 66 do not overlap each other, and the first dynamic vibration absorber 50 and the second dynamic vibration absorber 60 may be attached in proximity to each other when holding the base plate 41. Thus, the axial direction width may be reduced, and thereby the space may be saved.

Although embodiments of the present disclosure are described as above, the present disclosure is not limited thereto, and may be modified variously within technical ideas described in aspects, specifications, and drawings of the present disclosure.

For solving the foregoing problems, a hydraulic power transmission (10) according to the present disclosure includes: a pump impeller (11) configured to be rotated around a center axis (X) by a drive force from a drive source; a turbine impeller (12) configured to be rotated around the center axis (X) by flow of a fluid generated by rotation of the pump impeller (11); a cover member (14) connected to the pump impeller (11) to cover an outer side of the turbine impeller (12); a lock-up clutch (20) capable of mechanically coupling the cover member (14) and the turbine impeller (12) to each other; and an output member (30) configured to be rotated around the center axis (X) integrally with the turbine impeller (12) and coupled to an output shaft, in which a plurality of primary springs (28) are attached to the lock-up clutch (20), a plurality of secondary springs (38) are attached to the output member (30), an intermediate member (40) is disposed between the primary spring (28) and the secondary spring (38) holding the output member (30) and coupled to each other in series, a first dynamic vibration absorber (50) including a first mass body (51) and a first damper member (58) and a second dynamic vibration absorber (60) including a second mass body (61) and a second damper member (68) are attached to the intermediate member (40), and the first dynamic vibration absorber (50) and the second dynamic vibration absorber (60) have set frequencies different from each other.

Thus, the intermediate member (40) is disposed between so-called twin dampers formed by the primary spring (28) and the secondary spring (38) which are coupled to each other in series, in which with a dynamic vibration absorber attached to the intermediate member (40), when the intermediate member (40) vibrates, the dynamic vibration absorber vibrates in a reverse phase to the vibration of the intermediate member (40), the intermediate member (40) and the dynamic vibration absorber cancel mutual vibrations, and thereby damping performance may be exhibited in an efficient manner. Further, when the dynamic vibration absorber attached to the intermediate member (40) includes two dynamic vibration absorbers, that is, the first dynamic vibration absorber (50) and the second dynamic vibration absorber (60), and a set frequency of the first dynamic vibration absorber (50) and a set frequency of the second dynamic vibration absorber (60) are different from each other, damping performance may be obtained even in a frequency band between a first set frequency (fdd1) of the first dynamic vibration absorber (50) and a second set frequency (fdd2) of the second dynamic vibration absorber (60). Thus, damping performance may be exhibited in a wide frequency band. Further, since two dynamic vibration absorbers, that is, the first dynamic vibration absorber (50) and the second dynamic vibration absorber (60) are attached to the intermediate member (40), there is no need to add a new member to the pump impeller (11) and the turbine impeller (12) and thereby an increase in size of the device may be suppressed. Thus, it is possible to provide a hydraulic power transmission (10) including a damper mechanism exhibiting damping performance in a wide frequency band without an increase in size of the device.

In addition, the above hydraulic power transmission (10) may be configured such that the first dynamic vibration absorber (50) and the second dynamic vibration absorber (60) are each formed in an annular plate shape, the intermediate member (40) includes: an annular plate-shaped base plate (41) configured to support one end of each of the first damper member (58), the second damper member (68) and the secondary spring (38) and having a locking claw (46) formed at an outer diameter end thereof, the locking claw (46) being configured to be locked between a plurality of primary springs (28); and an annular plate-shaped lid (42) configured to support another end of each of the first damper member (58), the second damper member (68) and the secondary spring (38), and the first dynamic vibration absorber (50) and the second dynamic vibration absorber (60) may be held integrally with respect to the output shaft by holding the output member (30) with the base plate (41) and the lid (42) while fixing the first dynamic vibration absorber (50) and the second dynamic vibration absorber (60) on the same axis as the center axis (X). Thus, when the base plate (41) and the lid (42) of the intermediate member (40) and two dynamic vibration absorbers, that is, the first dynamic vibration absorber (50) and the second dynamic vibration absorber (60) are constituted in an annular plate shape, and all of those components are integrally held on the same axis as the center axis (X) of the output member (30), axial direction width may be reduced, and thereby the space may be saved.

In addition, the above hydraulic power transmission (10) may be configured such that the first mass body (51) includes an annular plate-shaped first mass main body (52) with the center axis (X) as a center and a plate-shaped first projecting plate (53) projecting from the first mass main body (52) to an inner diameter side, the second mass body (61) includes an annular plate-shaped second mass main body (62) with the center axis (X) as a center, and a plate-shaped second projecting plate (63) projecting from the second mass main body (62) to an inner diameter side, the first mass body (51) and the second mass body (61) are disposed such that the first projecting plate (53) and the second projecting plate (63) have circumferential direction phases different from each other, and both side faces of the first damper member (58) in an elastic deformation direction may be held in a first holding hole (54) formed in the first projecting plate (53); and both side faces of the second damper member (68) in the elastic deformation direction of may be held in the second holding hole (64) formed in the second projecting plate (63). Thus, when attaching two dynamic vibration absorbers onto the same axis as the intermediate member (40), overlapping of the first projecting plate (53) and the second projecting plate (63) with each other may be prevented and a space formed in a range from the inner diameter side of the first mass main body (52) and the second mass main body (62) to the outer diameter side of the output member (30) may be utilized efficiently by disposing the two dynamic vibration absorbers such that the first projecting plate (53) and the second projecting plate (63) have circumferential direction phases different from each other. Thus, the space may be saved.

In addition, the above hydraulic power transmission (10) may be configured such that a plurality of the first damper members (58) and a plurality of the second damper members (68) are disposed, the first mass body (51) includes an annular plate-shaped first mass main body (52) with the center axis (X) as a center and a first projecting claw (56) projecting in the axial direction from an outer periphery of the first mass main body (52) toward the base plate (41), the second mass body (61) includes an annular plate-shaped second mass main body (62) with the center axis (X) as a center and having a diameter larger than the first mass body (51), and a second projecting claw (66) projecting from the second mass main body (62) to an inner diameter side, the first mass body (51) and the second mass body (61) are disposed such that the first projecting claw (56) and the second projecting claw (66) have circumferential direction phases different from each other; the first projecting claw (56) is disposed so as to be abutted between the plurality of first damper members (58), and the second projecting claw (66) is disposed so as to be abutted between the plurality of second damper members (68). Thus, in the configuration where there are a plurality of first damper members (58) and a plurality of second damper members (68) held on the base plate (41); the first projecting claw (56) projecting in the axial direction from the first mass main body (52) is abutted between the plurality of first damper members (58); and the second projecting claw (66) projecting in the inner circumferential direction from the second mass main body (62) is abutted between the plurality of second damper members (68), the first dynamic vibration absorber (50) and the second dynamic vibration absorber (60) may be attached to each other in proximity when holding the base plate (41) without overlapping circumferential direction positions of the first projecting claw (56) and the second projecting claw (66). Thus, axial direction width may be reduced and thereby the space may be saved.

In addition, the above hydraulic power transmission (10) may be configured such that the set frequencies of the first dynamic vibration absorber (50) and the second dynamic vibration absorber (60) are set such that a larger set frequency (fH) is less than 1.2 times of a smaller set frequency (fL). Thus, when the first set frequency (fdd1) of the first dynamic vibration absorber (50) and the second set frequency (fdd2) of the second dynamic vibration absorber (60) are different from each other and a larger set frequency (fH) is less than 1.2 times of the smaller set frequency (fL), there is not so much difference between the set frequencies, and thereby damping performance may be obtained in a frequency band between the first set frequency (fdd1) of the first dynamic vibration absorber (50) and the second set frequency (fdd2) of the second dynamic vibration absorber (60) in a reliable manner.

Above reference numerals in parentheses represent reference numerals of corresponding components in embodiments described later as an example of the present disclosure.

The present disclosure provides a hydraulic power transmission including a damper mechanism exhibiting damping performance in a wide frequency band without enlarging the device.

Obviously, numerous modifications and variations of the present invention are possible in light of the above teachings. It is therefore to be understood that within the scope of the appended claims, the invention may be practiced otherwise than as specifically described herein.

What is claimed is:

1. A hydraulic power transmission comprising:
    a pump impeller configured to be rotated around a center axis by a drive force from a drive source;
    a turbine impeller configured to be rotated around the center axis by flow of a fluid generated by rotation of the pump impeller;
    a cover member connected to the pump impeller to cover an outer side of the turbine impeller;
    a lock-up clutch capable of mechanically coupling the cover member and the turbine impeller to each other; and
    an output member configured to be rotated around the center axis integrally with the turbine impeller and coupled to an output shaft, wherein
    a plurality of primary springs are attached to the lock-up clutch,
    a plurality of secondary springs are attached to the output member,
    an intermediate member is disposed between the primary springs and the secondary springs holding the output member and coupled to each other in series,
    a first dynamic vibration absorber comprising a first mass body and a first damper member and a second dynamic vibration absorber comprising a second mass body and a second damper member are attached to the intermediate member,
    the first dynamic vibration absorber and the second dynamic vibration absorber have set frequencies different from each other,
    the first dynamic vibration absorber and the second dynamic vibration absorber are each formed in an annular plate shape,
    the intermediate member comprises:
        an annular plate-shaped base plate configured to support one end of each of the first damper member, the second damper member and the secondary spring and having a locking claw formed at an outer diameter end thereof, the locking claw being configured to be locked between a plurality of the primary springs; and
        an annular plate-shaped lid configured to support another end of each of the first damper member, the second damper member and the secondary spring, and
    the first dynamic vibration absorber and the second dynamic vibration absorber are held integrally with respect to the output shaft by holding the output member with the base plate and the lid while fixing the first dynamic vibration absorber and the second dynamic vibration absorber on the same axis as the center axis.

2. The hydraulic power transmission according to claim 1, wherein
    the first mass body includes an annular plate-shaped first mass main body with the center axis as a center, and a plate-shaped first projecting plate projecting from the first mass main body to an inner diameter side,
    the second mass body includes an annular plate-shaped second mass main body with the center axis as a center, and a plate-shaped second projecting plate projecting from the second mass main body to an inner diameter side,
    the first mass body and the second mass body are disposed such that the first projecting plate and the second projecting plate have circumferential direction phases different from each other, and
    both side faces of the first damper member in an elastic deformation direction are held in a first holding hole formed in the first projecting plate, and both side faces of the second damper member in an elastic deformation direction are held in a second holding hole formed in the second projecting plate.

3. The hydraulic power transmission according to claim 1, wherein
    a plurality of the first damper members and a plurality of the second damper members are disposed,
    the first mass body includes an annular plate-shaped first mass main body with the center axis as a center, and a first projecting claw projecting in the axial direction from an outer periphery of the first mass main body toward the base plate,
    the second mass body includes an annular plate-shaped second mass main body with the center axis as a center and having a diameter larger than the first mass body, and a second projecting claw projecting from the second mass main body to an inner diameter side,
    the first mass body and the second mass body are disposed such that the first projecting claw and the second projecting claw have circumferential direction phases different from each other, and
    the first projecting claw is disposed so as to be abutted between the plurality of first damper members, and the second projecting claw is disposed so as to be abutted between the plurality of second damper members.

4. The hydraulic power transmission according to claim 1, wherein
    the set frequencies of the first dynamic vibration absorber and the second dynamic vibration absorber are set such that a higher set frequency is less than 1.2 times of a lower set frequency.

5. A hydraulic power transmission comprising:
    a pump impeller to be rotated around a center axis by a drive force from a drive source;
    a turbine impeller to be rotated around the center axis by fluid flow generated by rotation of the pump impeller;
    a cover member connected to the pump impeller to cover the turbine impeller;
    a lock-up clutch capable of mechanically coupling the cover member and the turbine impeller;
    an output member coupled to an output shaft and to be rotated around the center axis integrally with the turbine impeller;
    a plurality of primary springs attached to the lock-up clutch;
    a plurality of secondary springs attached to the output member;

an intermediate member holding the output member and connecting the primary springs and the secondary springs;
a first dynamic vibration absorber attached to the intermediate member and having a first frequency, the first dynamic vibration absorber comprising:
a first mass body; and
a first damper member; and
a second dynamic vibration absorber attached to the intermediate member and having a second frequency different from the first frequency, the second dynamic vibration absorber comprising:
a second mass body; and
a second damper member,
wherein the first dynamic vibration absorber and the second dynamic vibration absorber are each formed in an annular plate shape,
wherein the intermediate member comprises:
an annular plate-shaped base plate to support one end of each of the first damper member, the second damper member and the secondary spring and having a locking claw formed at an outer diameter end thereof, the locking claw configured to be locked between the plurality of primary springs; and
an annular plate-shaped lid to support another end of each of the first damper member, the second damper member and the secondary spring, and
wherein the first dynamic vibration absorber and the second dynamic vibration absorber are held integrally with respect to the output shaft by holding the output member with the base plate and the lid while fixing the first dynamic vibration absorber and the second dynamic vibration absorber on the same axis as the center axis.

6. The hydraulic power transmission according to claim 5, wherein the first mass body includes an annular plate-shaped first mass main body with the center axis as a center, and a plate-shaped first projecting plate projecting from the first mass main body to an inner diameter side,
wherein the second mass body includes an annular plate-shaped second mass main body with the center axis as a center, and a plate-shaped second projecting plate projecting from the second mass main body to an inner diameter side,
wherein the first mass body and the second mass body are disposed such that the first projecting plate and the second projecting plate have circumferential direction phases different from each other,
wherein both side faces of the first damper member in an elastic deformation direction are held in a first holding hole formed in the first projecting plate, and
wherein both side faces of the second damper member in an elastic deformation direction are held in a second holding hole formed in the second projecting plate.

7. The hydraulic power transmission according to claim 5, wherein a plurality of the first damper members and a plurality of the second damper members are disposed,
wherein the first mass body includes an annular plate-shaped first mass main body with the center axis as a center, and a first projecting claw projecting in the axial direction from an outer periphery of the first mass main body toward the base plate,
wherein the second mass body includes an annular plate-shaped second mass main body with the center axis as a center and having a diameter larger than the first mass body, and a second projecting claw projecting from the second mass main body to an inner diameter side,
wherein the first mass body and the second mass body are disposed such that the first projecting claw and the second projecting claw have circumferential direction phases different from each other,
wherein the first projecting claw is disposed so as to be abutted between the plurality of first damper members, and
wherein the second projecting claw is disposed so as to be abutted between the plurality of second damper members.

8. The hydraulic power transmission according to claim 5, wherein
the set frequencies of the first dynamic vibration absorber and the second dynamic vibration absorber are set such that a higher set frequency is less than 1.2 times of a lower set frequency.

9. The hydraulic power transmission according to claim 5, wherein the first dynamic vibration absorber and the second dynamic vibration absorber are fixed integrally with a rivet.

10. The hydraulic power transmission according to claim 5,
wherein the first dynamic vibration absorber is placed on the base plate,
wherein the output member is placed on the first dynamic vibration absorber,
wherein the second dynamic vibration absorber is placed on the output member, and
wherein the lid is placed on the second dynamic vibration absorber.

11. The hydraulic power transmission according to claim 5, further comprising a stator to deflect a flow of hydraulic oil flowing into the pump impeller from the turbine impeller.

12. The hydraulic power transmission according to claim 11, wherein the stator is disposed so as to be held between the pump impeller and the turbine impeller.

13. The hydraulic power transmission according to claim 1, wherein
the first damper member is formed by a third spring and the second damper member is formed by a fourth spring, and
a ratio of a spring constant of the first dynamic vibration absorber to an inertial moment of the first dynamic vibration absorber is different than a ratio of a spring constant of the second dynamic vibration absorber to an inertial moment of the second dynamic vibration absorber.

14. The hydraulic power transmission according to claim 1, wherein
the first damper member is formed by a third spring and the second damper member is formed by a fourth spring,
the plurality of secondary springs are disposed radially inward of an outer circumferential surface of the output member, and
the first damper member and the second damper member are each disposed radially outward of the plurality of secondary springs.

15. The hydraulic power transmission according to claim 1, wherein
the base plate and the lid of the intermediate member sandwich the output member on opposite sides of the output member about the center axis.

16. The hydraulic power transmission according to claim 15, wherein the base plate and the lid form respective outer axial ends of the intermediate member.

17. The hydraulic power transmission according to claim 5,
wherein the first damper member is formed by a third spring and the second damper member is formed by a fourth spring, and
wherein a ratio of a spring constant of the first dynamic vibration absorber to an inertial moment of the first dynamic vibration absorber is different than a ratio of a spring constant of the second dynamic vibration absorber to an inertial moment of the second dynamic vibration absorber.

18. The hydraulic power transmission according to claim 5,
wherein the first damper member is formed by a third spring and the second damper member is formed by a fourth spring, wherein the plurality of secondary springs are disposed radially inward of an outer circumferential surface of the output member, and
wherein the first damper member and the second damper member are each disposed radially outward of the plurality of secondary springs.

19. The hydraulic power transmission according to claim 5,
wherein the base plate and the lid of the intermediate member sandwich the output member on opposite sides of the output member about the center axis.

20. The hydraulic power transmission according to claim 19,
wherein the base plate and the lid form respective outer axial ends of the intermediate member.

* * * * *